United States Patent
Holter (12)

(10) Patent No.: US 6,170,846 B1
(45) Date of Patent: Jan. 9, 2001

(54) VEHICLE SUPPORT SYSTEM

(76) Inventor: Jeffrey W. Holter, 2205 Mediterranean Ave., Arlington, TX (US) 76011

( * ) Notice: Under 35 U.S.C. 154(b), the term of this patent shall be extended for 0 days.

(21) Appl. No.: 09/216,589

(22) Filed: Dec. 18, 1998

(51) Int. Cl.$^7$ ................................................ B62H 1/00
(52) U.S. Cl. ......................... 280/293; 280/297; 280/301
(58) Field of Search .................................. 280/293, 297, 280/301, 302, 303

(56) References Cited

U.S. PATENT DOCUMENTS

| | | | |
|---|---|---|---|
| 88,198 | 3/1869 | Paine | 280/301 |
| 497,549 | 5/1893 | Rider | 280/301 |
| 514,044 | 2/1894 | Sherwood | 280/301 |
| 518,698 | 4/1894 | Pipes et al. | 403/93 |
| 530,726 | 12/1894 | Scott et al. | 36/72 B |
| 537,265 | 4/1895 | Bell | 280/296 |
| 626,239 | 6/1899 | Lindstrom | 280/301 |
| 641,609 | 1/1900 | Rymal | 280/301 |
| 3,608,929 | 9/1971 | Baginski | 280/301 |
| 4,026,574 | 5/1977 | Bonora et al. | 280/295 |
| 4,067,543 * | 1/1978 | Orth et al. | 254/86 R |
| 4,095,823 * | 6/1978 | Nishida | 280/764 |
| 4,358,127 | 11/1982 | Kissick | 280/303 |
| 4,367,883 | 1/1983 | Anderson | 280/301 |
| 4,556,230 * | 12/1985 | Diekman | 280/301 |
| 4,671,374 | 6/1987 | Kouyama et al. | 180/219 |

FOREIGN PATENT DOCUMENTS

| 612892 * | 4/1935 | (DE) | 280/293 |
|---|---|---|---|
| 901151 * | 6/1945 | (FR) | 280/301 |
| 901221 * | 6/1945 | (FR) | 280/293 |
| 7837 * | 4/1906 | (GB) | 280/301 |

* cited by examiner

Primary Examiner—Brian L. Johnson
Assistant Examiner—Daniel Yeagley
(74) Attorney, Agent, or Firm—Haynes and Boone LLP (57) ABSTRACT

A vehicle support system for maintaining a vehicle in an upright position. The support system includes a base plate attached to a side surface and first and second mounting blocks attached to the base plate. Pivotably mounted between the first and second mounting blocks is a shaft to which a support leg and ratchet gear are fixedly mounted. A slot is formed in an upper body portion of the second mounting block which laterally extends over the ratchet gear. Mounted in the slot is a plunger and a biasing spring which downwardly biases the plunger such that a lower side surface thereof rides along an exterior side surface of the ratchet gear to allow the support leg to pivot, from an initial position, in a first direction along a first plane generally orthogonal to the side surface of the vehicle. Outwardly projecting faces formed along the exterior side surface of the ratchet gear engage the plunger to prevent the support leg from pivoting in a second direction, opposite to the first direction, along the plane. Retraction of a cable, coupled to the plunger, lifts the plunger, against the downward bias of the biasing spring, out of engagement with the ratchet gear such that a spring force produced by a return spring coupled between the second mounting block and the shaft causes the support leg to pivot in the second direction until returning to the initial position.

22 Claims, 5 Drawing Sheets

VEHICLE SUPPORT SYSTEM

BACKGROUND OF THE INVENTION

1. Field of the Invention

The invention relates generally to support systems for vehicles such as motorcycles and, more particularly, to a motorcycle equipped with an outwardly pivotable kickstand configured for supporting the motorcycle at various angles relative to the ground.

2. Description of Related Art

To stand upright, most two-wheeled conveyances such as bicycles or motorcycles require some type of support system. Most bicycles and motorcycles are equipped with a support system commonly referred to as a "kickstand" which, when extended, supports the bicycle or motorcycle in an upright position. A relatively simple device, the design of the kickstand has changed little over the years. Typically, the kickstand is comprised of a support leg configured to pivot between a first, retracted, position and a second, extended, position in which the kickstand supports the bicycle or motorcycle in the upright position. Most commercially available kickstands pivot in a plane generally parallel to the bicycle, motorcycle or other two wheeled vehicle.

While most kickstands pivot in a plane generally parallel to the bicycle, motorcycle or other two-wheeled vehicle, a limited number of kickstands pivot in a plane generally orthogonal to the two-wheeled vehicle. See, for example, U.S. Pat. No. 88,198 to Paine, U.S. Pat. No. 497,549 to Rider, U.S. Pat. No. 514,044 to Sherwood and U.S. Pat. No. 537,265 to Bell, all of which disclose bicycles equipped with kickstands which pivot in a plane generally orthogonal thereto. Like bicycles, motorcycles and other motorized two-wheeled vehicles commonly include a kickstand which pivots in a plane generally parallel to the vehicle. However, U.S. Pat. No. 4,026,574 to Bonora et al. discloses a combination kickstand and footrest in which, in the retracted position, the kickstand forms part of the footrest. The kickstand may also be pivoted outwardly to support the motorcycle in an upright position.

Like many such devices, the kickstands disclosed in the aforementioned patents are pivotable between an initial position and a final position where the kickstand engages the ground to support the bicycle in an upright position. Some kickstands, however, are pivotable between an initial position and plural extended positions. See, for example, U.S. Pat. No. 518,698 to Pipes et al. and U.S. Pat. No. 530,725 to Scott et al. In each of these patents, however, the disclosed support system includes a base member having plural slots formed therein. Forming a portion of the kickstand is a spring-biased projecting member which would extend into a slot to lock the kickstand into a selected position. Disengagement of the kickstand, however, required the operator to physical retract the kickstand, an inconvenient task at best.

Thus, there remains a need for a vehicle support system which includes a support leg which may be locked into or unlocked from a variety of positions with ease. It is, therefore, the object of the invention to provide such a vehicle support system.

SUMMARY OF THE INVENTION

In one embodiment, the present invention is of a vehicle support system which maintains the vehicle in an upright position. The support system includes a base structure attached to a side surface of the vehicle, a support leg pivotably mounted to the base structure and a ratchet coupled to the base structure and the support leg. The ratchet allows the support leg to pivot, from an initial position in a first direction along a plane generally orthogonal to the side surface of the vehicle while preventing the support leg from pivoting in a second direction, opposite to the first direction, along the plane. In further aspects thereof, the vehicle support system may further included a release coupled to the base structure, either alone or in combination with a return spring coupled between the base structure and the support leg. The release selectively allows the support leg to pivot in the second direction along the plane while the return spring causes the support leg to return to the initial position. In still another aspect thereof, the ratchet prevents the support leg from pivoting, in the second direction, through a first one of a plurality of stops through which the support leg is pivotable in the first direction.

In a further aspect of this embodiment of the invention, the support leg, when in the initial position, is generally orthogonal to a surface on which the vehicle rests on when in the upright position. In another, the support leg supports the vehicle at a plurality of angles relative to the surface on which the vehicle rests when in the upright position. Each of these angles corresponds to one of the plurality of stops through which the support leg may pivot. In still another, the ratchet includes a ratchet gear and a plunger which rides along an exterior side surface thereof.

In accordance with still another aspect thereof, the base structure is comprised of a base plate attached to the side surface of the vehicle and a mounting block attached to the base plate. The plunger of the ratchet is slidingly received within a slot formed in the mounting block. Positioned between an interior side surface of the slot and an upper side surface of the plunger is a biasing spring for downwardly biasing the plunger such that the lower side surface thereof rides along the exterior side surface of the ratchet gear. A retractable cable for lifting the plunger out of engagement with the exterior side surface of the ratchet gear may also be provided as part of the release.

In another embodiment, the present invention is of a vehicle support system which maintains the vehicle in an upright position. The support system includes a base plate attached to a side surface and first and second mounting blocks attached to the base plate at a first, generally orthogonal, angle. Pivotably mounted between the first and second mounting blocks is a shaft to which a support leg and ratchet gear are fixedly mounted. A slot is formed in an upper body portion of the second mounting block which laterally extends over the ratchet gear. Mounted in the slot is a plunger and a biasing spring which downwardly biases the plunger such that a lower side surface thereof rides along an exterior side surface of the ratchet gear to allow the support leg to pivot, from an initial position, in a first direction along a first plane generally orthogonal to the side surface of the vehicle.

Outwardly projecting tooth faces formed along the exterior side surface of the ratchet gear engage the plunger to prevent the support leg from pivoting in a second direction, opposite to the first direction, along the plane. Retraction of a cable, coupled to the plunger, lifts the plunger, against the downward bias of the biasing spring, out of engagement with the ratchet gear such that a spring force produced by a return spring coupled between the second mounting block and the shaft causes the support leg to pivot in the second direction until returning to the initial position.

In one aspect of this embodiment of the invention, each one of the tooth faces forms a corresponding one of a plurality of stops for the ratchet gear. In another, the support leg is generally orthogonal to a surface on which the vehicle rests and, in a still further aspect thereof, for each one of the plurality of stops, the support leg supports the vehicle in the upright position at a respective angle relative to the surface.

In still another embodiment, the present invention is of a motorcycle having a frame to which a support system base is attached. Mounted to the base is a support leg pivotable, from an initial position, along a plane generally orthogonal to the frame of the vehicle. A ratchet coupled to the base and the support leg allows the support leg to pivot, from the initial position, in a first direction along the plane while preventing the support leg from pivoting in a second direction, opposite to the first direction, along the plane. A release system coupled to the frame and the ratchet selectively allows the support leg to pivot in the second direction along the plane.

In one aspect of this embodiment of the invention, the ratchet is comprised of a ratchet gear and a plunger, each respectively coupled to the base. A lower side surface of the plunger rides along an exterior side surface of the ratchet gear when the support leg is pivoted in the first direction. In another aspect thereof, a retractable cable coupled to the plunger lifts the plunger out of engagement with the exterior side surface of the ratchet gear to allow the support leg to pivot in the second direction. Preferably, the release system includes a hand control, coupled to the frame and the retractable cable, which is selectively actuatable by an operator of the motorcycle to cause the cable to retract. By retracting the cable, the plunger is lifted out of engagement with the exterior side surface of the ratchet gear and a return spring coupled between the base and the support leg causes the support leg to return to the initial position.

BRIEF DESCRIPTION OF THE DRAWINGS

The invention will be better understood and its numerous objects and advantages will become apparent to those skilled in the art by reference to the following drawings in which:

FIG. 2c-1 is a left perspective view of an alternate embodiment of the second mounting block and plunger illustrated in FIGS. 2a–b;

FIG. 2c-2 is an exploded view of the second mounting block and plunger of FIG. 2c-1;

DETAILED DESCRIPTION OF A PREFERRED EMBODIMENT

Figure 1:
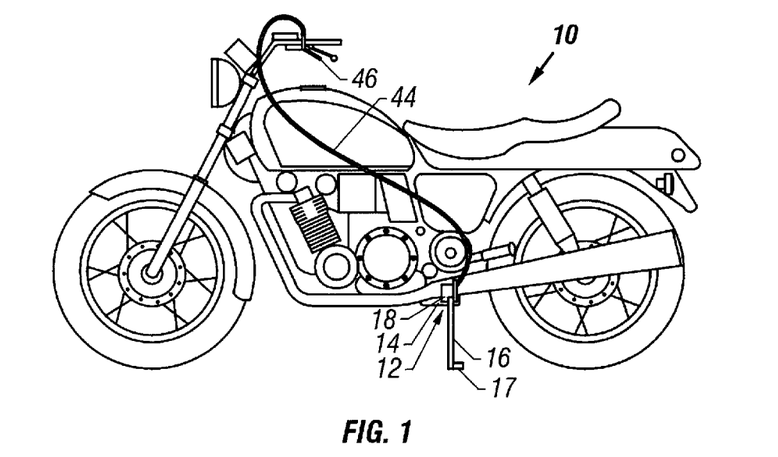
FIG. 1 is a side view of a motorcycle having a vehicle support system constructed in accordance with the teachings of the present invention mounted thereto.

Referring first to FIG. 1, a vehicle 10 having a vehicle support system 12 mounted thereto may now be seen. As disclosed herein, the vehicle 10 is a conventionally configured motorcycle which includes a metal frame or other support structure having a side surface, accessible from one side thereof, to which the vehicle support system 12 is mounted. Of course, while the vehicle 10 is disclosed to be a motorcycle, it is specifically contemplated that the disclosed support system 12 is equally suitable for use with a variety of other types of vehicles, for example, bicycles, mopeds or scooters, as well as any other wheeled vehicle requiring assistance in remaining in an upright position. Preferably, the vehicle support system 12 is mounted along one side of the vehicle 10, typically, the side along which the vehicle 10 requires support to prevent the vehicle 10 from falling over. As will be more fully described below, the vehicle support system 12 includes a support leg 16 outwardly pivotable from a first, upright, position into plural extended positions, one of which is shown in FIG. 1. By the term "outwardly pivotable", it is intended to refer to the characteristic that, as the support leg 16 pivots, along a line, from the first, upright, position, the plane in which the support leg 16 pivots is at an angle relative to the plane along which the vehicle 10 longitudinally extends. Preferably, the relationship between the longitudinal extension of the vehicle 10 and the axis of rotation for the vehicle support system 12 is a generally orthogonal relationship.

The vehicle support system 12 is comprised of a base plate 14, a support leg 16 having a resting pad 17 at one end, and a mounting structure 18 which mounts the support leg 16 to the base plate 14. The base plate 14 is formed of a metal or other durable, hardened material and may be shaped to conform to the shape of the exposed surface of the frame to which the base plate 14 is mounted. Preferably, plural apertures 20, one of which is shown in FIG. 2b, are formed in the base plate 14. A bolt 22 (see FIG. 2a) extends through the aperture 20 (see FIG. 2b) and secures the base plate 14 to the frame of the vehicle 10. The number of bolts 22 needed to firmly secure the base plate 14 to the frame of the vehicle 10 will vary, depending on the size and shape of the base plate 14 and/or the frame of the vehicle 10. It is contemplated, however, that, irregardless of size or shape, two or three bolts will satisfactorily secure most base plates configurations to the underlying vehicle frame.

Figure 2A:
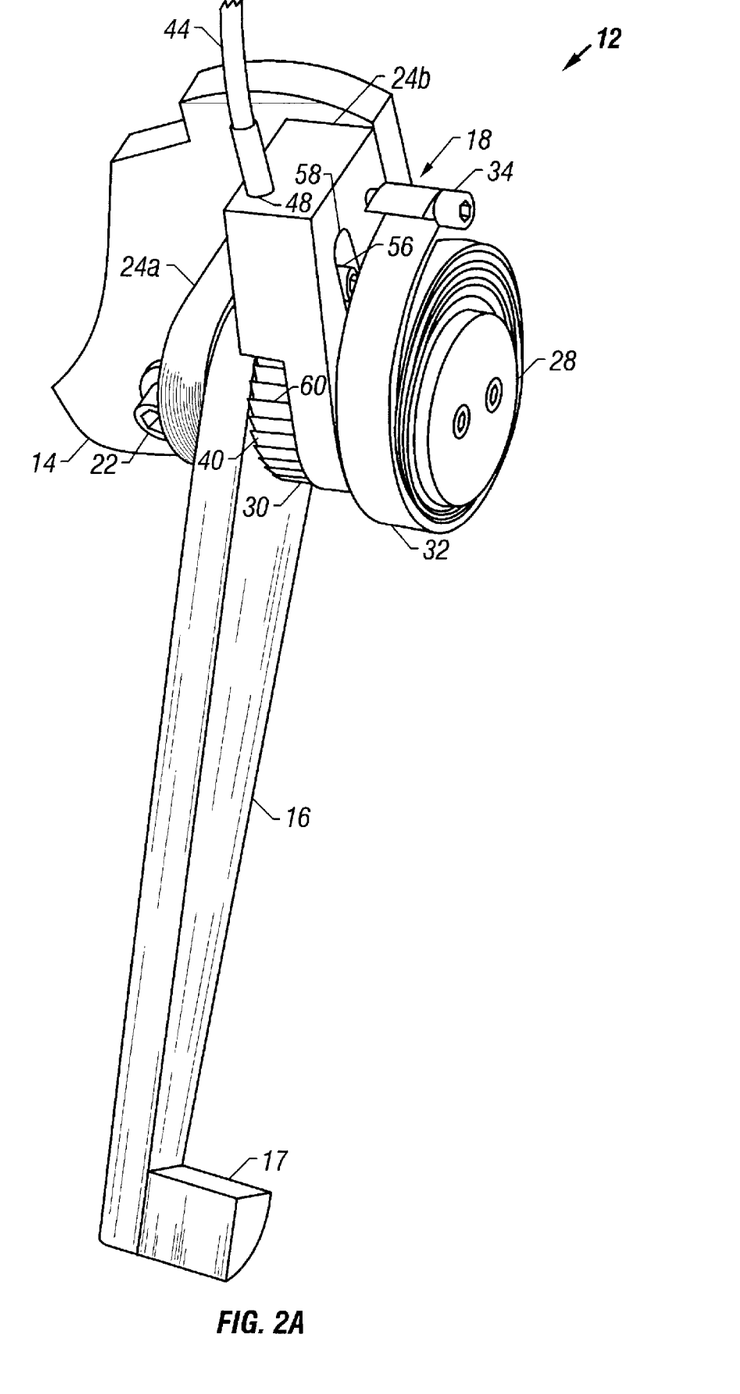
FIG. 2a is an enlarged right perspective view of the vehicle support system of FIG. 1.
Figure 2B:
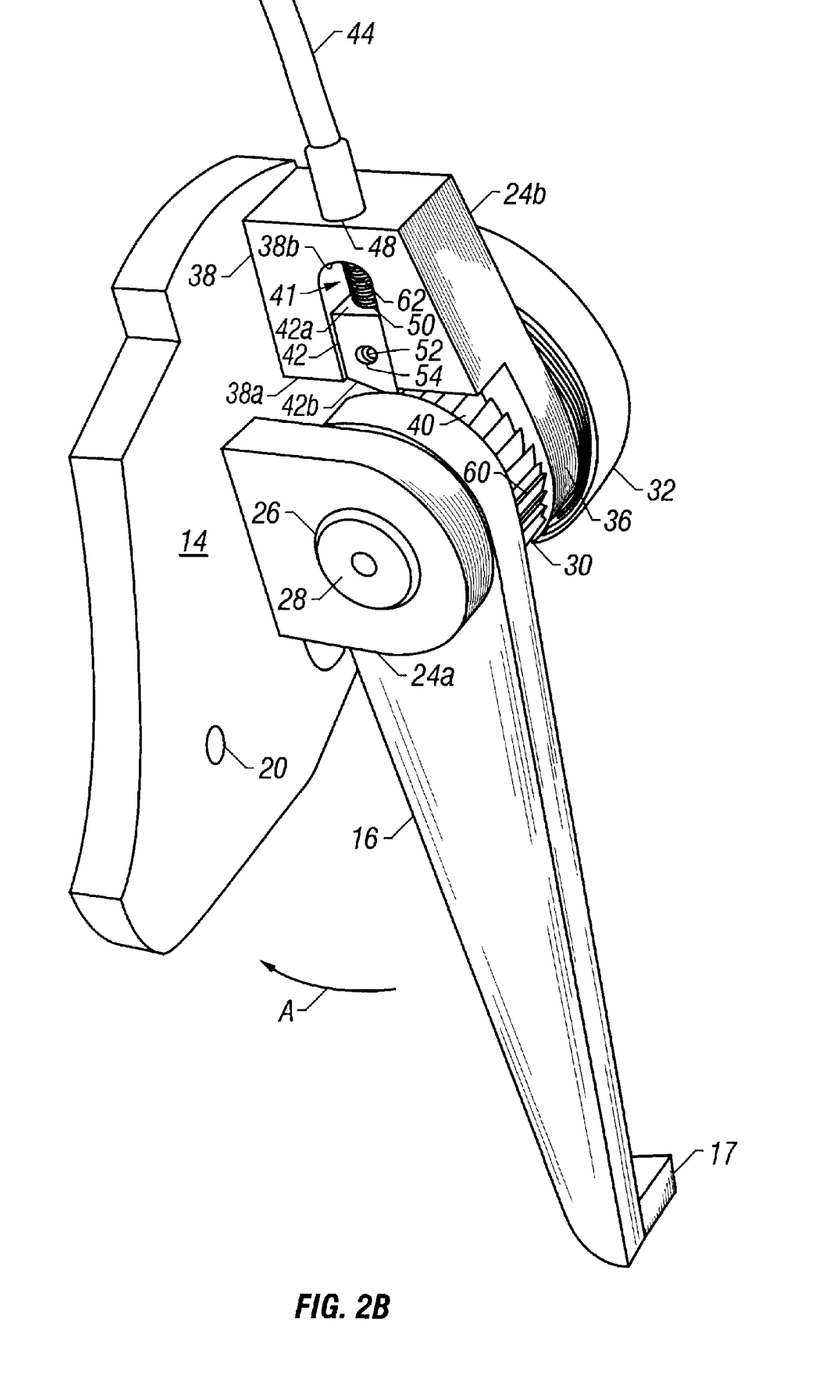
FIG. 2b is an enlarged left perspective view of the vehicle support system of FIG. 1.

Referring next to FIGS. 2a–b, fixedly secured to the base plate 14 are first and second mounting blocks 24a and 24b, each having a generally cylindrical aperture 26 formed therein. Preferably, the mounting blocks 24a and 24b each outwardly projects from the base plate 14 at a generally orthogonal angle. A shaft 28 is inserted within the apertures 26 and rotatably secured to the mounting blocks 24a and 24b in a conventional manner, for example, using a tongue and groove technique, which allows the shaft 28 to rotate freely about its central axis while secured to the mounting blocks 24a and 24b. While the mounting block 24a merely assists in securing the shaft 28 in position, as will be more fully described below, the mounting block 24b performs a number of other functions including housing a plunger portion of a ratchet mechanism for the vehicle support system 12.

Also mounted to the shaft 28 are the support leg 16, a ratchet gear portion 30 of the ratchet mechanism and a return spring 32. Preferably, the support leg 16 and the ratchet gear portion 30 are positioned adjacent to each other on the shaft 28 and in between the first and second mounting blocks 24a and 24b. The return spring 32, on the other hand is mounted on the other side of the second mounting block 24b relative to the ratchet gear portion 30. Both the support leg 16 and the ratchet gear portion 30 are fixedly attached to the shaft 28 such that rotation of the shaft 28 causes the support leg 16 and the ratchet gear portion 30 to rotate therewith. It is contemplated that both the support leg 16 and the ratchet gear portion 30 may be fixedly mounted to the shaft 28 using a variety of suitable techniques, for example, a conventional welding technique. To ease assembly of the vehicle support system 12, it is preferred that the support leg 16 and the ratchet gear portion 30 each include an aperture (not shown) through which the shaft 28 extends. However, other configurations, for example, a configuration in which the shaft 28, the support leg 16 and the ratchet gear portion 30 are constructed as a single piece are equally suitable for the uses contemplated herein.

The ratchet gear portion 30 of the ratchet mechanism has a series of teeth 40 formed along an exterior side surface thereof. For example, in one embodiment of the invention, it is contemplated that a tooth 40 is provided for each 18 degree segment of the ratchet gear portion 30. Thus, in such an embodiment, the ratchet gear portion 30 would have twenty teeth 40. Of course, the number of teeth 40 formed on the ratchet gear portion 30 will vary depending on the diameter thereof. Each tooth 40 includes a face 60 which, as will be more fully described below, acts as a stop for the ratchet mechanism. However, it should be noted that only certain ones of the teeth 40 function as stops. For example, while the ratchet gear portion 30 has about twenty teeth, since the range of motion for the support leg 16 is on the order of about 135 degrees from the initial position where the support leg 16 is fully retracted and does not provide any support to the vehicle 10 to the fully extended position where the vehicle 10 is supported fully upright, i.e., generally orthogonal to a surface on which the vehicle 10 rests, for many configurations thereof, the support leg 16 shall be pivotable through only seven or eight stops.

Finally, the return spring 32 is attached at one end (not shown) to the shaft 28 and attached, at the other end, to a support member 34, for example, a pin, laterally projecting from the second mounting block 24b. By pivoting the shaft 28 in a clockwise direction (Direction "A" in FIG. 2b), one end of the return spring 32 is rotated with the shaft 28 while the other end remains fixed to the second mounting block 24b, a spring force which urges the return spring 28 to return to its initial, rest, position is generated within the return spring 28.

As previously set forth, the second mounting block 24b is positioned between the ratchet gear portion 30 and the return spring 32. The second mounting block 24b is notched so that it includes a lower body portion 36 and a wider upper body portion 38. The lower portion 36 of the second mounting block 24b is positioned adjacent to, and has a height generally equal to, the ratchet gear portion 30. As a result, the upper portion 38 of the second mounting block 24b extends over the ratchet gear portion 30. As best seen in FIG. 2b, the upper portion 38 of the second mounting block 24b has a slot 41 formed therein which extends from a lower side surface 38a to an exposed interior side surface 38b. Slidably received in the slot 41 is a plunger portion 42 of the ratchet mechanism. The plunger portion 42 is retained within the slot 41 by a retaining member 56, which itself is slidably retained within a slot 58, fixedly attached to the plunger portion 42. Thus, the plunger portion 42 is free to move upwardly or downwardly, within the slot 41, in response to respective upward or downward biasing forces.

Turning momentarily to FIGS. 2c-1 and 2c-2, an alternate configuration of the second mounting block 24b, hereafter referred to as second mounting block 24b', will now be described in greater detail. As will be appreciated by one skilled in the art, insertion of the plunger portion 42 within the slot 41, when configured as illustrated in FIGS. 2a and 2b, is a time consuming operation which requires great care. In particular, the task of holding the plunger portion 42, within the slot 41, while securing the retaining member 56 thereto has proven difficult in actual practice. Thus, to ease the task of assembling the vehicle support system 12, it is further contemplated that the slot 40' extend to an upper side surface 24b'-a of the second mounting block 24b' and be shaped to include a narrower section 40'-a and a wider section 40'-b, thereby providing a "T" configuration to the slot 40'. A ridge 42'-a, having dimensions corresponding to the wider portion 40'-b of the slot 40', is formed on one side of the plunger portion 42' while the main body part of the plunger portion 42' is sized to have dimensions which correspond to the narrower section 40'-a of the slot 40', thereby providing the plunger portion 42 with a similar "T" configuration. As before, the second end of the release cable 44 is fixedly secured to the plunger portion 42'. In this configuration, however, the release cable 44 extends through an aperture (not shown) formed in cover member 76 and the biasing spring 62 engages, on one end, a lower side surface of the cover member 76 and, on the other end, an upper side surface of the plunger portion 42'.

Figure 2C:
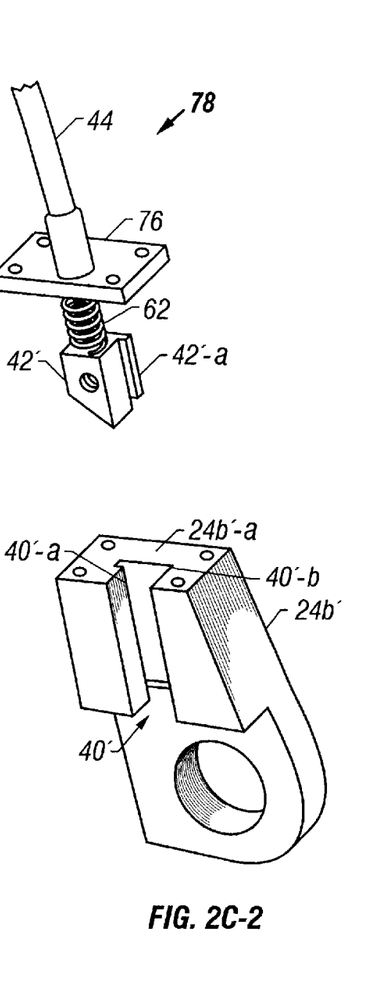
Figure 2C:
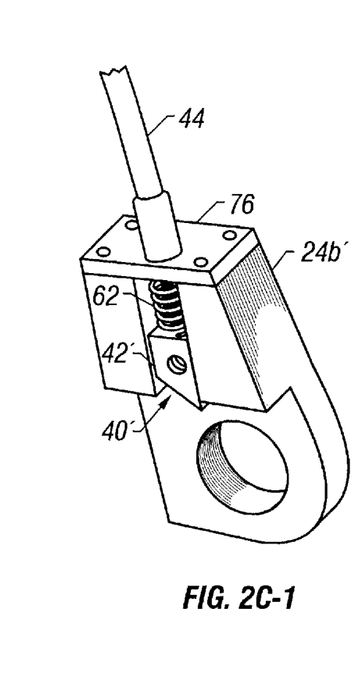

The plunger portion 42', the biasing spring 62, the cover member 76 and retractable cable 44 collectively form a cover assembly 78 which may be readily mounted to the second mounting block 24b'. More specifically, the retractable cable 44 is first inserted through the aperture formed in the cover member 76. The biasing spring is slid over the portion of the retractable cable 44 extending through the cover member 76. The plunger portion 42' is then fixedly secured to the end of the retractable cable 44 such that the biasing spring 62 engages the cover member 76 and the plunger portion 42' on opposite ends thereof. The plunger portion 42' is then slid into the slot 40' and the cover member 76 bolted to the upper side surface 24b'-a of the second mounting block 24b' to complete assembly thereof.

Returning now to FIGS. 1 and 2a–b, collectively, a retractable release cable 44, preferably formed of wire or another suitable material, is coupled, at a first end, to a control lever 46 (see FIG. 1) and, at a second end, extends through an aperture 48 in the upper body portion 38 of the second mounting block 24b, into the slot 41 and through a vertically-orientated interior passage 50 formed in the plunger portion 42. There, the second end of the release cable 44 is fixedly secured to the plunger portion 42, for example, by a screw 52 which extends through a horizontally-orientated passage 54 in the plunger portion 42 and the release cable 44. Slidably mounted over a portion of the release cable 44 which extends through the slot 41 is a biasing spring 62. The biasing spring 62 engages on, at one end, the interior side surface 38b of the upper body portion 38 and, at the other end, an upper side surface 42a of the plunger portion 42.

A spring force generated by the biasing spring 62 drives a lower side surface 42b of the plunger portion 42 into engagement with the exterior side surface of the ratchet gear portion 30. Preferably, the lower side surface 42b is downwardly angled to enhance rideability of the plunger portion 42 on the exterior side surface of the ratchet gear portion 30. To raise the plunger portion 42 out of engagement with the exterior side surface of the ratchet gear portion 30, the cable 44 is retracted, for example, by pulling the control lever 46. It is contemplated that the cable 44 and the control lever 46 will operate in a manner similar to a conventionally configured "pull-type" hand actuatable braking system common on many bicycles and other wheeled vehicles. Accordingly, further description of the operation of the cable 44 and/or control lever 46 is not deemed necessary. It is further contemplated that the control lever 46 be mounted on the vehicle 10 at a location selected such that hand actuation of the control lever 46 by an operator of the vehicle 10 may be readily accomplished when the operator is seated on the vehicle 10. For example, the control lever 46 may be mounted on the handlebars of the vehicle 10. Of course, numerous other locations on the vehicle 10 will be equally suitable locations for mounting the control lever 46.

Figure 2D:
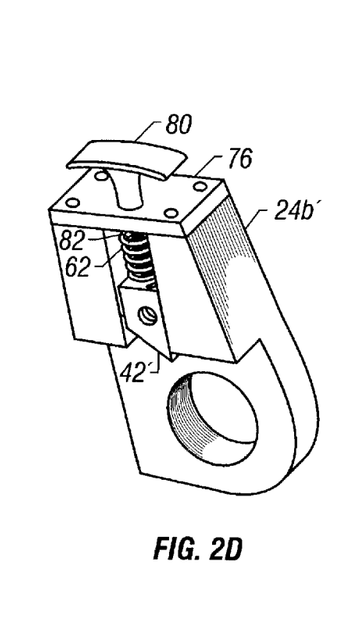
FIG. 2d is a left perspective view of the second mounting block and plunger of FIG. 2c-1 which illustrates a first alternate configuration of the release mechanism thereof.
Figure 2E:
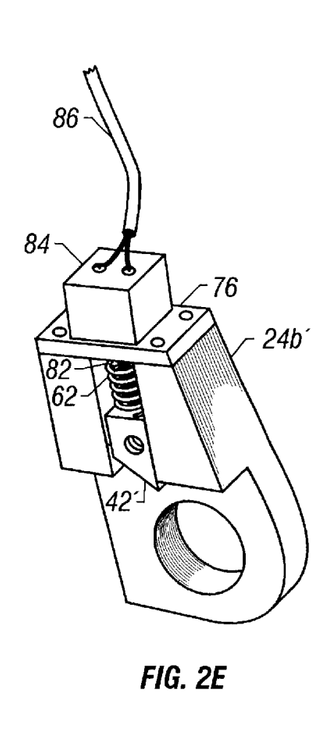
FIG. 2e is a left perspective view of the second mounting block and plunger of FIG. 2c-1 which illustrates a second alternate configuration of the release mechanism thereof.

Turning now to FIGS. 2d and 2e, first and second alternate configurations of the release mechanism for the support leg 16 of the vehicle support system 16 will now be described in greater detail. As embodied herein, the alternate configurations of the release mechanism is disclosed in conjunction with the second mounting block 24b'. It is fully contemplated, however, that the alternate configurations of the release mechanism are equally suitable for use with the second mounting block 24b. In FIG. 2d, the elongated retractable cable 44 and the handlebar mounted control lever 46 have been replace with a lever 80 mounted to an upper side surface of the cover member 76 and a shaft 82 coupled, on one end, to the plunger portion 42' and, on the other end, to the lever 80. To raise the plunger portion 42' out of engagement with the exterior side surface of the ratchet gear portion 30, the operator need only pull upwardly on the handle 80. While such a configuration may lack the ease of use provided by the handlebar mounted control lever 46, the use of the lever 80 both simplifies and reduces the cost of the support system 10. In FIG. 2e, the lever 80 has been replaced by an electric motor 84. The electric motor 84 is activated by a switch (not shown), for example, a push-button switch mounted on the handlebar of the vehicle 10, coupled to the electric motor 84 by conductor 86. When the push-button is depressed, the electric motor 84 is activated and a drive mechanism (not shown) thereof, coupled to the shaft 82, pulls the shaft 82 upwardly, thereby raising the plunger portion 42' out of engagement with the exterior side surface of the ratchet gear portion 30. When the pushbutton is released, the electric motor 84 is deactivated and the plunger portion 42' returns to its original position.

Referring now to FIGS. 1, 2a–b and 3a–h, the operation of the vehicle support system 12 will now be described in greater detail. In accordance with the teachings of the present invention, the support leg 16 of the vehicle support system 12 is pivotable along a plane generally orthogonal to the frame of the vehicle 10. More specifically, the support leg 16 is pivotable, in a first direction along the plane, from an initial position shown in FIG. 3a to a fully extended position shown in FIG. 3b. In the initial position, the support leg 16 does not engage surface 64 and the support leg 16 does not provide any support to the vehicle 10 to maintain it in an upright position. Typically, the support leg 16 would be maintained in the initial position while being operated, manually pushed or otherwise held in place. In contrast, when the support leg 16 is in the fully extended position, the support leg 16 engages the surface 64 at a suitable angle such that the vehicle 10 may be maintained in a fully upright position, i.e., orthogonal to the surface 64.

Figure 3A:
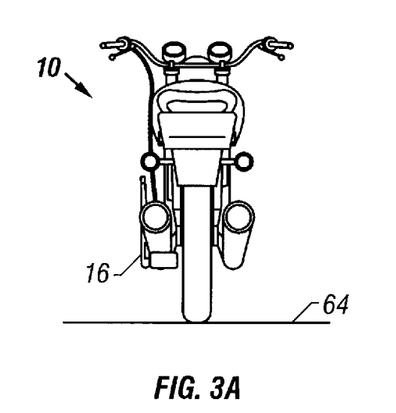
FIG. 3a is a rear view of the motorcycle of FIG. 1 with the vehicle support system of FIGS. 1–2b in an initial position.

From the initial position, the vehicle support system 12 may be used to support the vehicle 10 by pivoting the support leg 16 in the first direction. For example, an operator of the vehicle 10 may use his or her foot to push down on the support leg 16, thereby causing the support leg 16 to pivot in the direction A. As previously set forth, the vehicle support system 12 includes a ratchet mechanism comprised of the ratchet gear portion 30 and the plunger portion 42 which, under the influence of the biasing spring 62, rides on the exterior side surface of the ratchet gear portion 30. As the operator pushes down on the support leg 16, the pivotable shaft 28 fixedly attached to the support leg 16 is also rotated in the direction A. In turn, the ratchet gear portion 30 of the ratchet mechanism rotates in the direction A and the downwardly angled lower side surface 42b of the plunger portion 42 rides along the exterior side surface of the ratchet gear portion 30.

However, the pivoting of the support leg 16 is unidirectional. In other words, in the event the operator attempted to return the support leg 16 to the initial position by simply pulling up on the support leg 16, the ratchet mechanism would prevent the support leg 16 from pivoting in the opposite direction. More specifically, the exterior side surface of the ratchet gear portion 30 has a series of teeth formed thereon. As the support leg 16 is pivoted in the direction A, the lower side surface 42b of the plunger portion 42 rides along an upwardly sloped surface of a first tooth As the plunger portion 42 rides upwardly, the biasing spring 62 is compressed, thereby generating a spring force which, after the lower side surface 42b of the plunger portion 42 passes the face 60 of the tooth, the biasing spring 62 drives the plunger portion 42 downwardly into engagement with the upwardly sloped surface of an adjacent tooth. While the operator may continuing pivoting the support leg 16 in the direction A, in the event that the operator tries to pivot the support leg 16 in the opposite direction, the plunger portion 42 will lockingly engage the face 60 of the tooth, thereby preventing any further movement, by the support leg 16 in the opposite direction.

In this manner, the face 60 of each tooth formed along the exterior side surface of the ratchet gear portion 30 forms a stop which, while not preventing further pivoting of the support leg 16 in the direction A, prevents any pivoting of the support leg 16 in the opposite direction. Furthermore, the weight of the vehicle 10 pushing downwardly against the support leg 16 drives the face 60 into a tight engagement with the plunger portion 42, thereby locking the support leg 16 in place and enabling the support leg 16 to support the vehicle 10 in an upright position. As it is specifically contemplated that the ratchet gear portion 30 of the ratchet mechanism will have plural stops formed thereon, the support leg 16 may be locked in a variety of positions relative to the vehicle 10. A number of these positions are illustrated in FIGS. 3b through 3g. The support leg 16 may be selectively locked in any or all of these, as well as other positions not shown herein, by appropriate placement of the stops formed on the ratchet gear portion 30.

Figure 3B:
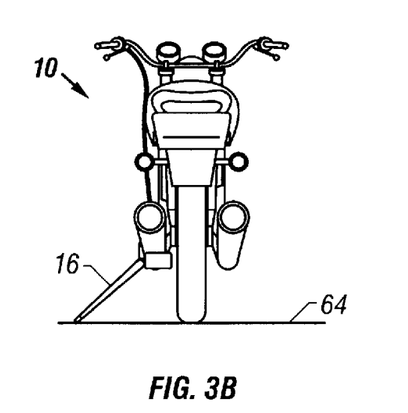
FIG. 3b is a rear view of the motorcycle of FIG. 1 with the vehicle support system of FIGS. 1–2b in a first extended position.
Figure 3C:
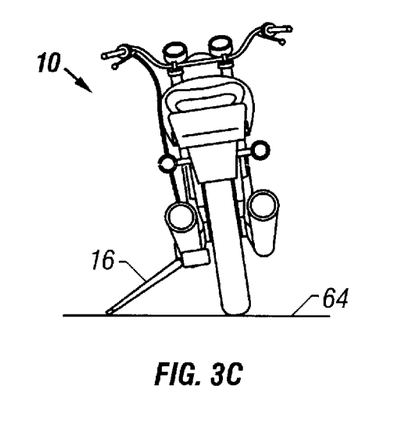
FIG. 3c is a rear view of the motorcycle of FIG. 1 with the vehicle support system of FIGS. 1–2b in a second extended position.
Figure 3D:
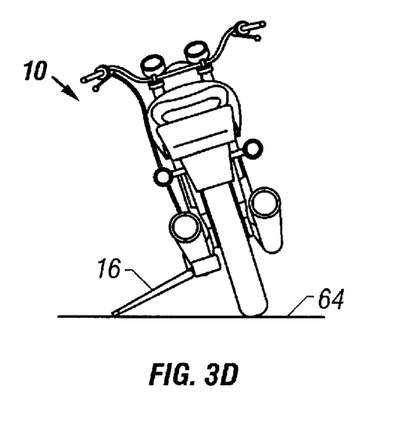
FIG. 3d is a rear view of the motorcycle of FIG. 1 with the vehicle support system of FIGS. 1–2b in a third extended position.
Figure 3E:
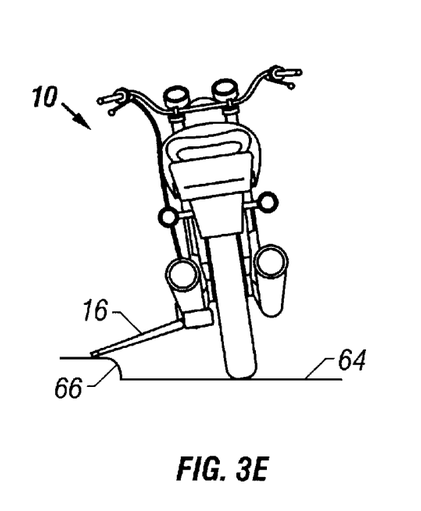
FIG. 3e is a rear view of the motorcycle of FIG. 1 with the vehicle support system of FIGS. 1–2b in a fourth extended position.
Figure 3F:
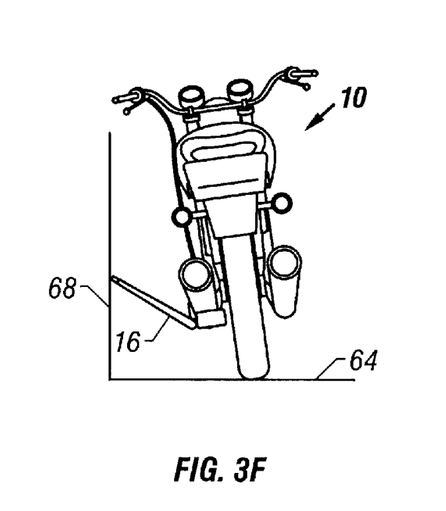
FIG. 3f is a rear view of the motorcycle of FIG. 1 with the vehicle support system of FIGS. 1–2b in a fifth extended position.
Figure 3G:
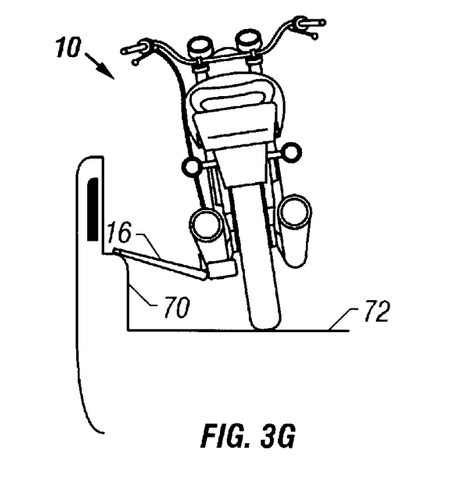
FIG. 3g is a rear view of the motorcycle of FIG. 1 with the vehicle support system of FIGS. 1–2b in a sixth extended position.
Figure 3H:
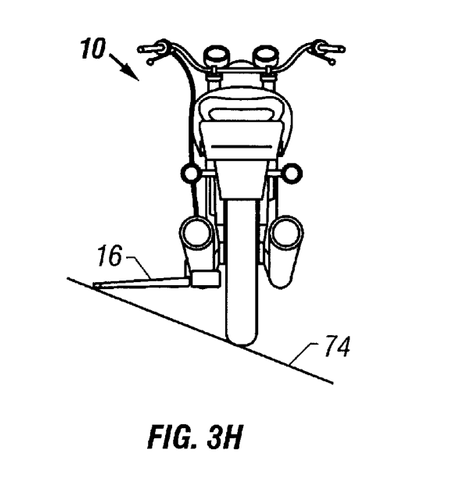
FIG. 3h is a rear view of the motorcycle of FIG. 1 with the vehicle support system of FIGS. 1–2b in a seventh extended position.

In FIG. 3*b*, the support leg 16 is locked in a fully extended position such that the vehicle 10 is supported by the support leg 16 in a fully upright position. In FIGS. 3*c* and 3*d*, respectively, the support leg 16 is locked in a partially extended position such that the vehicle 10 is supported by the support leg 16 in positions which are four and ten degrees, respectively, off the full upright position. It is contemplated that these partially upright positions will be favored by the operator when faced with conditions, for example, high wind, where the vehicle 10 is more likely to tip over. In FIGS. 3*e* through 3*h*, the support leg 16 is shown in still other partially extended positions. It is contemplated that each of these positions will be favored by the operator under certain conditions. For example, in FIG. 3*e*, rather than engaging the surface 64, the support leg 16 engages an elevated surface 66, for example, a curb. In FIG. 3*f*, the support leg 16 engages a wall 68, for example, the wall of a garage where the vehicle 10 is housed. In FIG. 3*g*, the support leg 16 engages a sidewall 70 of a pick-up truck 72 used to transport the vehicle 10. Finally, in FIG. 3*h*, the support leg 16 engages an angled surface 74, for example, a hill. As before, the support leg 16 is in yet another partially extended position. Here, of course, the support leg 16 is extended to a much lesser extent than in the prior examples. Nevertheless, the vehicle 10 itself remains only about ten degrees off the full upright position. Thus, this example may perhaps best illustrate how the support leg 16 may be positioned to compensate for physical characteristics of the underlying support surface, thereby enabling the vehicle 10 to be supported in a stable position irregardless of any physical characteristics of the underlying support surface that would ordinarily result in the vehicle being supported in a less stable position.

Finally, to retract the support leg 16, the operator depresses or otherwise manipulates the control lever 46 in a manner which will cause the cable 44 to retract. By retracting the cable 44, the plunger portion 42 of the ratchet mechanism is lifted out of its engagement with the exterior side surface of the wheel portion 16, thereby freeing the support leg 16 to pivot in the direction opposite to the direction A. Once the support leg 16 is released, the spring force residing in the return spring 32 urges the return spring 32 to return to its initial, rest, position. As the return spring 32 returns to the rest position, the shaft 28 rotates, thereby causing the support leg 16 and ratchet gear portion 30 to return to their initial positions as well. In this manner, upon actuation of the control lever 46, the support leg 16 automatically returns to the initial, upright position shown in FIG. 3*a*. Upon return of the support leg 16 to its initial position, the control lever 46 may be released. Alternately, of course, the control lever 46 may be released before the support leg 16 returns to its initial position, for example, if adjustment of the support leg 16 into a different position is desired.

Thus, there has been described and illustrated herein, a support system capable of maintaining a vehicle in a variety of upright positions. By providing the support system with a leg which may be locked into a variety of positions, the support system is uniquely suitable to properly support the vehicle under a variety of conditions. By its incorporation of a hand actuatable control lever, the support system is also extremely easy to engage and disengage. It should be clearly understood, however, that various modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. For a vehicle having a side surface, a vehicle support system for maintaining said vehicle in an upright position, comprising:

a base structure attached to said side surface, said base structure comprising a first body portion having a slot formed therein and a second body portion;

a support leg pivotably mounted to said base structure, said support leg pivotable, from an initial position to a fully extended position, along a plane generally orthogonal to said side surface of said vehicle, through a plurality of stops;

a ratchet gear having an exterior side surface, said ratchet gear coupled to said second body portion of said base structure and said support leg;

a retractable plunger coupled to said base structure, said retractable plunger slidably retained within said slot for engaging said ratchet gear, said plunger having a lower side surface which is engaged with said exterior side surface of said ratchet gear when unretracted and disengaged from said exterior side surface of said ratchet gear when retracted;

said ratchet gear and retractable plunger allowing said support leg to pivot, from said initial position to said fully extended position, in a first direction along said plane while preventing said support leg from pivoting in a second direction, opposite to said first direction, along said plane after said support leg has pivoted, in said first direction, into said fully extended position.

2. A vehicle support system according to claim 1 and further comprising:

a release, coupled to said base structure, said release selectively allowing said support leg to pivot in said second direction along said plane.

3. A vehicle support system according to claim 2 wherein said release further comprises:

a retractable shaft, coupled to said plunger;

wherein retraction of said shaft lifts said plunger out of engagement with said exterior side surface of said ratchet gear.

4. A vehicle support system according to claim 2 and further comprising:

a return spring coupled between said base structure and said support leg, said return spring causing said support leg to return to said initial position when said release allows said support leg to pivot in said second direction.

5. A vehicle support system according to claim 4 wherein, when said vehicle is in said upright position and said support leg is in said initial position, said vehicle is supported on a resting surface and said support leg does not engage said resting surface.

6. A vehicle support system according to claim 5 wherein, for each one of said plurality of stops, said support leg in said extended position supports said vehicle in said upright position at a respective one of a corresponding plurality of angles relative to said resting surface.

7. A vehicle support system according to claim 1 wherein said lower side surface of said retractable plunger engages said exterior side surface of said ratchet gear at a generally orthogonal angle.

8. For a vehicle having a side surface, a vehicle support system for maintaining said vehicle in an upright position, comprising:

a base structure attached to said side surface, said base structure further comprising:
  a base plate attached to said side surface;
  a mounting block attached to said base plate; and
  a biasing spring
a support leg pivotably mounted to said base structure, said support leg pivotable, from an initial position, along a plane generally orthogonal to said side surface of said vehicle;
a ratchet coupled to said base structure and said support leg, said ratchet allowing said support leg to pivot, from said initial position, in a first direction along said plane while preventing said support leg from pivoting in a second direction, opposite to said first direction, along said plane, said ratchet further comprising:
  a ratchet gear having an exterior side surface; and
  a plunger having a lower side surface which rides along said exterior side surface of said ratchet gear;
said mounting block having a slot in which said plunger is slidingly received, said slot exposing an interior side surface of said mounting block;
a release, coupled to said base structure, said release selectively allowing said support leg to pivot in said second direction along said plane;
a return spring coupled between said base structure and said support leg, said return spring causing said support leg to return to said initial position when said release allows said support leg to pivot in said second direction;
said support leg pivotable, in said first direction, through a plurality of stops;
said biasing spring downwardly biasing said plunger such that said lower side surface thereof rides along said exterior side surface of said ratchet gear;
said ratchet preventing said support leg from pivoting, in said second direction, through a first one of said plurality of stops after said support leg has pivoted, in said first direction, through said first stop;
wherein, when said vehicle is in said upright position and said support leg is in said initial position, said vehicle is supported on a resting surface and said support leg is generally orthogonal to said side surface of said vehicle; and
wherein, for each one of said plurality of stops, said support leg supports said vehicle in an extended position at a respective one of a corresponding plurality of angles relative to an resting surface.

9. A vehicle support system according to claim 8 wherein said exterior side surface of said ratchet gear includes a plurality of outwardly projecting faces, each one of said plurality of faces forming a respective one of said plurality of stops.

10. A vehicle support system according to claim 9 wherein said lower side surface of said plunger is downwardly angled.

11. For a vehicle having a side surface, a vehicle support system for maintaining said vehicle in an upright position, comprising:
  a base plate attached to said side surface;
  a first mounting block attached to said base plate;
  a second mounting block attached to said base plate;
  said first and second mounting blocks attached to said base plate at a first, generally orthogonal, angle;
  a shaft having a first end pivotably mounted to said first mounting block and a second end pivotably mounted to said second mounting block;
  a support leg fixedly mounted to said shaft, said support leg pivotable, from an initial position, along a first plane generally orthogonal to said side surface of said vehicle;
  a ratchet gear fixedly mounted to said shaft, said ratchet gear having an exterior side surface which includes a plurality of outwardly projecting tooth faces, said ratchet gear pivotable, from an initial position, along a second plane generally orthogonal to said side surface of said vehicle;
  said shaft and said ratchet gear pivoting in response to pivoting of said support leg;
  said second mounting block having an upper portion which extends laterally over said ratchet gear;
  said upper portion of said second mounting block having a slot formed therein, said slot exposing an interior side surface of said upper portion of said second mounting block;
  a plunger slidably received in said slot formed in said upper portion of said second mounting block, said plunger having a lower side surface which rides along said exterior side surface of said ratchet gear;
  a biasing spring positioned, in said slot, between an upper side surface of said plunger and said interior side surface of said second mounting block;
  said biasing spring downwardly biasing said plunger such that said lower side surface thereof rides along said exterior side surface of said ratchet gear to allow said support leg to pivot, from said initial position, in first plane;
  said tooth faces engaging said plunger to prevent said support leg from pivoting in a second direction, opposite to said first direction, along said first plane;
  a retractable cable coupled to said plunger;
  wherein retraction of said retractable cable lifts said plunger, against said downward bias of said biasing spring, out of engagement with said ratchet-gear; and
  a return spring coupled between said second mounting block and said shaft, said return spring in a rest position when said support leg is in said initial position;
  wherein rotation of said shaft produces, within said return spring, a spring force which causes said support leg to pivot in said second direction until returning to said initial position when said retractable cable lifts said plunger out of engagement with said ratchet gear.

12. A vehicle support system according to claim 11 wherein each one of said plurality of tooth faces forms a corresponding one of a plurality of stops for said ratchet gear.

13. A vehicle support system according to claim 12 wherein, when said vehicle is in said upright position and said support leg is in said initial position, said vehicle is supported on a resting surface and said support leg does not engage said resting surface.

14. A vehicle support system according to claim 13 wherein, for each one of said plurality of stops, said support leg in an extended position supports said vehicle in said upright position at a respective angle relative to said resting surface.

15. A motorcycle, comprising:
  a frame;
  a base for a support system, said base attached to said frame, said base having a first body portion having a slot formed therein in which a plunger slidably received;

a support leg pivotably mounted to said base, said support leg pivotable, from an initial position to a fully extended position along a plane generally orthogonal to said frame of said motorcycle;

a ratchet coupled to a second body portion of said base and said support leg, a biasing spring positioned in said slot between an upper side surface of said plunger and an interior side surface of said slot, said spring biasing said plunger downwardly to engage said ratchet, said ratchet allowing said support leg to pivot, from said initial position to said fully extended position, in a first direction along said plane while preventing said support leg from pivoting in a second direction, opposite to said first direction, along said plane after said support leg has pivoted, in said first direction, into said fully extended position;

a release system coupled to said frame and said ratchet, said release system selectively allowing said support leg to pivot in said second direction along said plane.

16. A motorcycle according to claim 15, wherein said ratchet further comprises:

a ratchet coupled to said base, said ratchet having an exterior side surface; and a plunger coupled to said base, said plunger having a lower side surface which rides along said exterior side surface of said ratchet.

17. A motorcycle according to claim 16, wherein said release system further comprises:

a retractable cable coupled to said plunger; and wherein retraction of said cable lifts said plunger out of engagement with said exterior side surface of said ratchet.

18. A motorcycle according to claim 17, wherein said release system further comprises:

a hand control coupled to said frame and said retractable cable, said hand control selectively actuatable by an operator of said motorcycle;

wherein actuation of said hand control causes said cable to retract.

19. A motorcycle according to claim 18 and further comprising:

a return spring coupled between said base and said support leg, said return spring causing said support leg to return to said initial position when said hand control retracts said cable and lifts said plunger out of engagement with said exterior side surface of said ratchet to allow said support leg to pivot in said second direction.

20. For a vehicle having a side surface, a vehicle support system for maintaining said vehicle in an upright position, comprising:

a base structure attached to said side surface, said base structure including a base plate attached to said side surface, a mounting block attached to said base plate, and a biasing spring;

a support leg pivotably mounted to said base structure, said support leg pivotable, from an initial position, along a plane generally orthogonal to said side surface of said vehicle;

a ratchet coupled to said base structure and said support leg, said ratchet allowing said support leg to pivot, from said initial position, in a first direction along said plane while preventing said support leg from pivoting in a second direction, opposite to said first direction, along said plane, said ratchet including a ratchet gear having an exterior side surface and a plunger having a lower side surface which rides along said exterior side surface of said ratchet gear;

said mounting block having a slot in which said plunger is slidingly received;

a release, coupled to said base structure, said release selectively allowing said support leg to pivot in said second direction along said plane;

said support leg pivotable, in said first direction, through a plurality of stops;

said biasing spring downwardly biasing said plunger such that said lower side surface thereof rides along said exterior side surface of said ratchet gear;

said ratchet preventing said support leg from pivoting, in said second direction, through a first one of said plurality of stops after said support leg has pivoted, in said first direction, through said first stop;

wherein, when said vehicle is in said upright position and said support leg is in said initial position, said vehicle is supported on a resting surface and said support leg is generally orthogonal to said side surface of said vehicle; and wherein, for each one of said plurality of stops, said support leg supports said vehicle in an extended position at a respective one of a corresponding plurality of angles relative to said resting surface.

21. A vehicle support system according to claim 20 wherein said release further comprises:

a retractable shaft, coupled to said plunger;

wherein retraction of said shaft lifts said plunger out of engagement with said exterior side surface of said ratchet gear.

22. A vehicle support system according to claim 21 and further comprising:

a return spring coupled between said base structure and said support leg, said return spring causing said support leg to return to said initial position when said release allows said support leg to pivot in said second direction.

* * * * *